United States Patent
Ammann et al.

(10) Patent No.: US 7,784,336 B2
(45) Date of Patent: Aug. 31, 2010

(54) LOAD CELL

(75) Inventors: Martin Ammann, Felben-Wellhausen (CH); Frank Furter, Winterthur (CH)

(73) Assignee: Kistler Holding AG, Winterthur (CH)

( * ) Notice: Subject to any disclaimer, the term of this patent is extended or adjusted under 35 U.S.C. 154(b) by 8 days.

(21) Appl. No.: 12/422,519

(22) Filed: Apr. 13, 2009

(65) Prior Publication Data

US 2009/0272182 A1 Nov. 5, 2009

(30) Foreign Application Priority Data

May 5, 2008 (CH) .................................. 0698/08

(51) Int. Cl.
*E01C 23/00* (2006.01)
(52) U.S. Cl. ........................................................ 73/146
(58) Field of Classification Search ........ 73/146–146.5, 73/146.8, 54.41, 54.24, 714; 310/348
See application file for complete search history.

(56) References Cited

U.S. PATENT DOCUMENTS 7,055,377 B2 * 6/2006 Paul et al. ................... 73/54.41
7,501,744 B2 * 3/2009 Yoshimine et al. .......... 310/340
7,603,906 B2 * 10/2009 Kroger et al. ................. 73/714
2006/0175097 A1 * 8/2006 Pirzada ....................... 177/145

OTHER PUBLICATIONS

Dr.-Ing. W. Evers, Dipl.Ing J. Reichel, Dipl.Ing. R. Eisenkolb, Dipl.-Math (FH) I. Ebhart, Vehicle-engineering RoaDyn™—a Tool for Rim and Chassis Development.

* cited by examiner

*Primary Examiner*—Jewel Thompson
(74) *Attorney, Agent, or Firm*—Dority & Manning, P.A.

(57) ABSTRACT

A load cell detects wheel forces and/or moments at tire test stands in the laboratory and on mobile test vehicles based on the piezoelectric measurement principle. The load cell comprises a base plate and a cover plate facing the base plate as well as a plate-shaped quartz sensor, arranged between the plates in a laminar manner. The base plate and cover plate are designed in an elongated shape and include two or more of the plate-shaped quartz sensors there between. The plate-shaped quartz sensors are arranged in an array with respect to the longitudinal orientation of the plates and are preloaded by the plates.

23 Claims, 2 Drawing Sheets

ND CELL

CROSS-REFERENCE TO RELATED APPLICATIONS

In accordance with 35 U.S.C 119, this application hereby claims priority to Swiss Application No. CH 00698/08, filed May 5, 2008.

STATEMENT REGARDING FEDERALLY SPONSORED RESEARCH OR DEVELOPMENT

N/A

TECHNICAL AREA

The invention relates to a sensor for the detection of wheel forces and/or moments at tire test stands in the laboratory and on mobile test vehicles, based on the piezoelectric measurement principle.

BACKGROUND

Wheel forces are measured at tire test stands in the laboratory and on mobile test vehicles to test and optimize tires and rims but also wheel suspensions and shock absorbers. Generally, two kinds of test arrangements are used for this purpose. In the first, the force sensors are mounted in the stationary region of the wheels at test stands or test vehicles, in so called measuring hubs, and in the second in the mobile regions of the wheels, for example in the rims of test vehicles. In both arrangements, several sensors are uniformly arranged around the wheel axis in a circle in the corresponding applications. Examples are the measuring hub type 9295 or the measuring wheel type 9296, which both are supplied by Kistler company.

Problems arise with applications for heavy truck wheels since in these cases much higher forces are transmitted. Conventional applications withstand total forces of up to 30 kN in wheel normal direction and up to 20 kN in the other directions. Since said total forces are directed through the load cells, they have to be designed in a corresponding manner. Load cells which are too weak might break during a test run and thus endanger the driver.

In order to be able to measure such high forces, either larger quartz discs or multiple load cells of conventional size have to be used. Often, there is not enough space for larger quartz discs, since the freely available area is limited to the outside by the radius of the rims and to the inside by the large shafts. If a larger number of quartz discs is used, the large number of charge channels which have to be carried by each of the quartz discs will become problematical. On the other hand, the assembly and disassembly of the wheels thus becomes more complicated, since each quartz disc has to be preloaded separately.

OBJECTS OF THE INVENTION

It is a principal object of the present invention to describe a measuring setup or a sensor for the detection of wheel forces and/or moments at tire test stands in the laboratory and on mobile test vehicles based on the piezoelectric measurement principle, which is also suitable for high loads at a high dynamic and high natural frequencies, in particular for heavy truck wheels.

These objects have been solved by the characteristics of the independent claims.

The idea underlying the present invention is that a load cell is used as the sensor mentioned in the beginning, which load cell comprises a base plate and a cover plate facing the base plate as well as two or more plate-shaped quartz sensors, arranged between said plates in a laminar manner. According to the present invention, the base plate and the cover plate are designed in an elongated shape, and the quartz sensors are arranged in an array with respect to the longitudinal orientation of the plates. Furthermore, the quartz sensors are preloaded by the plates.

Owing to the elongated shape, a plurality, e.g., 4, 5 or 6, of such load cells can be arranged on a circular line in the area that is available on a wheel. On the other hand, the assembly and disassembly is very simple since the load cells are already preloaded.

Further advantageous embodiments are described in the dependent claims.

BRIEF DESCRIPTION OF THE DRAWINGS

In the following, the invention is described in more detail with respect to the drawings, which show.

DESCRIPTION OF PRESENTLY PREFERRED EXEMPLARY EMBODIMENTS

Figure 1:
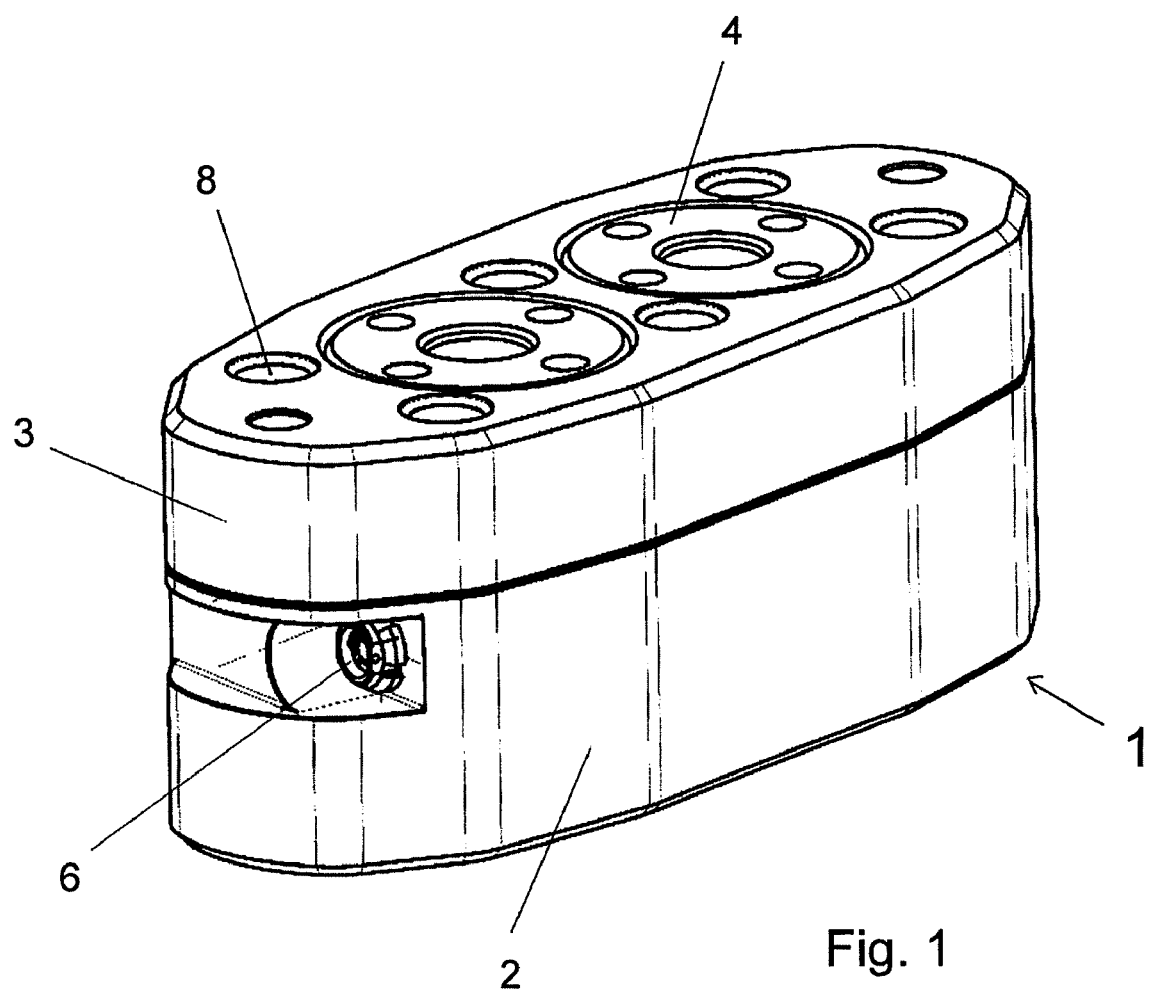
FIG. 1 is a schematic perspective illustration of a load cell according to the present invention having two quartz sensors.

FIG. 1 shows a load cell 1 according to a presently preferred embodiment of the present invention for the detection of wheel forces and/or moments at tire test stands in the laboratory and on mobile test vehicles. The load cell 1 comprises a base plate 2 and a cover plate 3 facing the base plate. As can be seen from FIG. 2, two plate-shaped quartz sensors 5 are arranged between these plates 2, 3 in a laminar manner. Furthermore, in FIG. 1 two preload nuts 4 can be seen. By rotation of each of the two preload nuts 4, the desired preload can be applied to the quartz sensor 5 (not shown in FIG. 1) disposed beneath the respective preload nut 4.

As shown in FIG. 1, mounting bores 8 are disposed surrounding the preload nuts 4. Said bores 8 are disposed through the base plate 2, not shown in FIG. 1, as well as through the cover plate 3. Fixing screws are able to engage with these plates 2, 3 via the said bores 8, at the side of the wheel as well as at the side of the vehicle or the test stand, respectively, and thus can fix the load cell 1. Therefore, in contrast to conventional measuring elements, the assembly is simpler for these purposes, since the quartz sensors 5 are already preloaded in said embodiment of the invention. Thereby, only the connection to the wheel components has to be carried out. Thus, any replacement of load cell 1 is also highly simplified. Alternatively, other mounting means than the mounting bores 8 can be provided.

Figure 2:
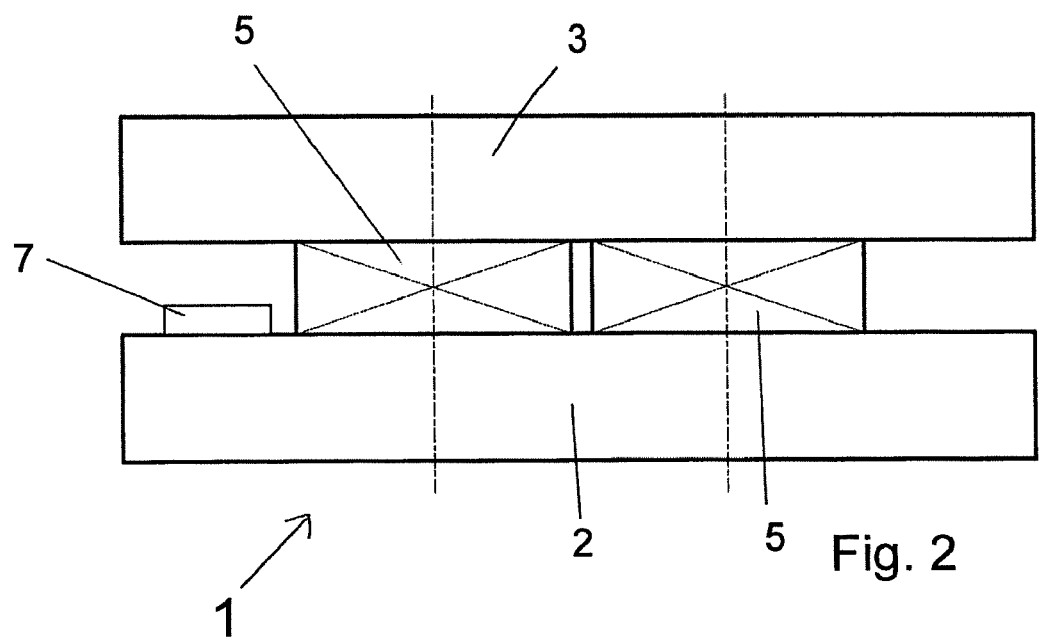
FIG. 2 is a schematic illustration of a cross-sectional view of the load cell according to FIG. 1.

According to the present invention, base plate 2 and cover plate 3 are designed in an elongated form. In particular, the load cell 1 is at least twice as long as wide. In the arrangement embodied as shown in FIG. 2, two quartz sensors 5 are arranged in the load cell 1. However, three or more quartz sensors 5 can be arranged in the load cell 1 in accordance with other embodiments of the present invention. In any case, said quartz sensors 5 should be arranged in an array with respect to the longitudinal orientation of the plates 2, 3. Moreover, the array also may continue on a circular segment, provided the radius of circular segment is larger than the width of the load cell 1.

Figure 3:
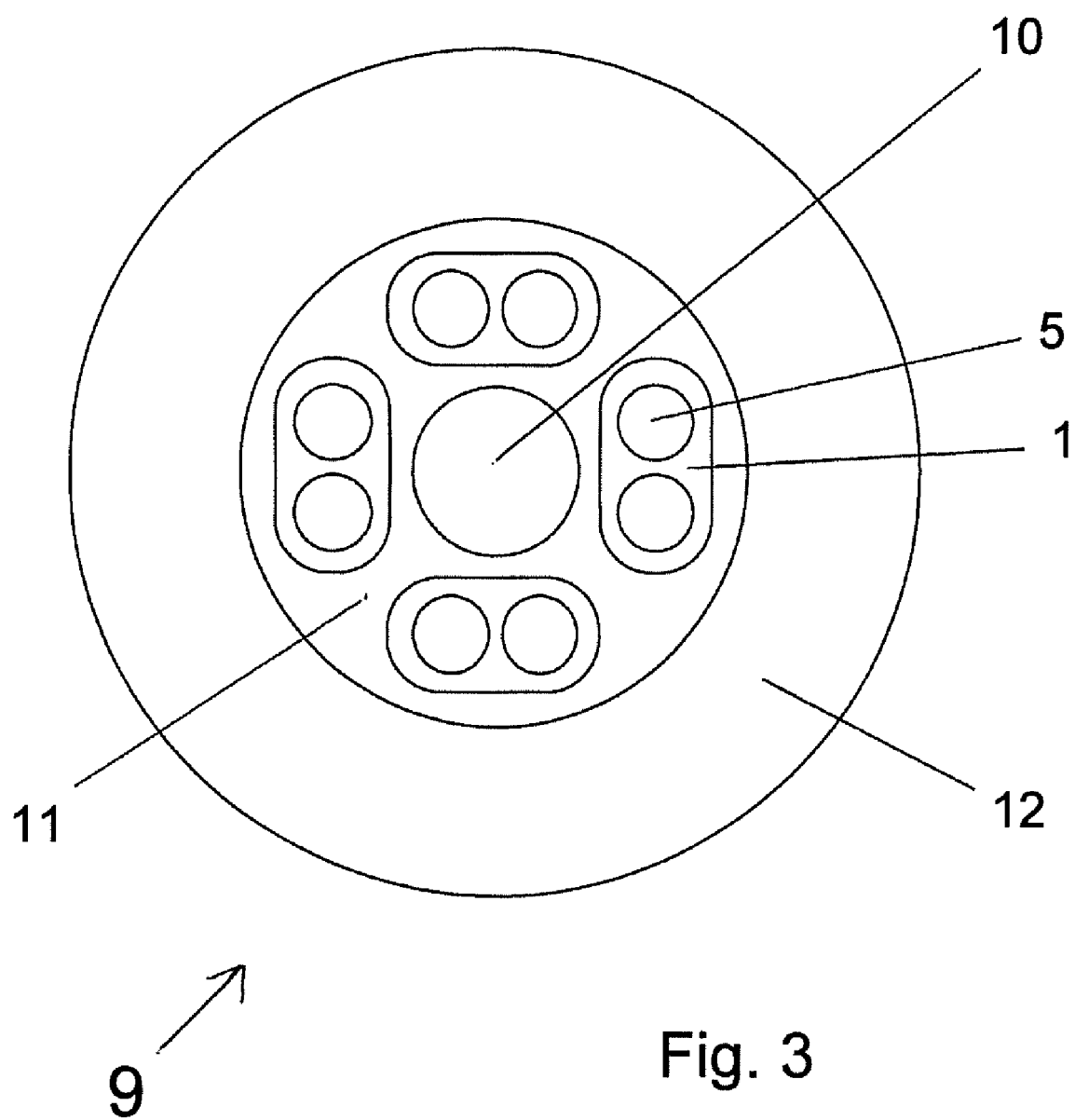
FIG. 3 is a schematic illustration of a plan view onto the assembly situation of a measuring wheel with 4 load cells according to an embodiment of the present invention.

As shown in the FIGS. 1 and 3, the load cell 1 may be designed with slanted or rounded edges. In particular, the load cell 1 may be defined by edges such that the load cell has an oval-like shape. By this form, load cells I having large quartz sensors 5 may be brought onto a rim 11, which in total can take up more force than the same number of round or rectangular load cells 1.

Preferably, no shunt forces exist between base plate 2 and cover plate 3, which allow for a load path between said plates 2, 3, which do not pass via the quartz sensors 5. The only possible shunt force occurs via the preload nuts 4.

As shown in the FIG. 1 for example, the measuring lines and neutral lines of the quartz sensors 5 are all combined in the load cell 1 in a bundled manner to a common connector 6. Therefore, only one connector 6 needs to be connected during the assembly and the replacement of a load cell 1, and not four single lines, such as would be the case if two individual measuring elements were employed instead of the load cell 1 of the present invention. Furthermore, as shown in the FIG. 2 for example, the load cell 1 desirably includes a preamplifier 7, which simplifies the further processing of the measurement signals.

Such load cells 1 according to the present invention may be incorporated within the area of heavy truck wheels, as is illustrated in FIG. 3. The load cells 1 are uniformly distributed around shaft 10 in the region of rim 11, onto which finally a tire 12 is mounted.

Since multiple quartz sensors 5 are disposed in the load cell 1 and multiple load cells 1, generally 3 to 8, are arranged in a circular manner around the wheel axis, said load cells 1 can have a size such that the complete arrangement of the load cells 1 can absorb and measure a load of more than 30 kN, in particular a load of more than 40 kN, in at least one direction, without the load cells 1 used for this purpose being damaged.

In particular, such load cells 1 may be employed in a stationary region or in the rotating region of test stands or of test vehicles.

LIST OF REFERENCE SYMBOLS

1 load cell
2 base plate
3 cover plate
4 preload nut in front of a quartz sensor
5 quartz sensor
6 connector
7 preamplifier
8 mounting devices
9 wheel
10 shaft
11 rim
12 tire

The invention claimed is:

1. A load cell for detecting wheel forces and/or moments at tire test stands in the laboratory and on mobile test vehicles, based on the piezoelectric measurement principle, the load cell comprising:
   a base plate defining an elongated shape;
   a cover plate facing the base plate, the cover plate defining an elongated shape;
   at least two plate-shaped quartz sensors arranged between said plates in a laminar manner and preloaded by the plates; and
   wherein the plate-shaped quartz sensors are arranged in an array with respect to the longitudinal orientation of the plates.

2. A load cell according to claim 1, wherein each of the base plate and the cover plate is designed with slanted edges.

3. A load cell according to claim 1, wherein each of the base plate and the cover plate is designed with rounded edges.

4. A load cell according to claim 1, wherein each of the base plate and the cover plate is designed with edges that exhibit an oval-like shape.

5. A load cell according to claim 1, further comprising a separate preload nut disposed in the base plate to apply a preload to each plate-shaped quartz sensor.

6. A load cell according to claim 1, further comprising a common connector, wherein each quartz sensor includes a measuring line and a neutral line and all of said measuring lines and neutral lines of the quartz sensors are connected to the common connector.

7. A load cell according to claim 1, wherein the quartz sensors, the base plate, the cover plate and the preload bolts are configured and disposed such that the shunt forces bypassing the quartz sensors pass between the base plate and the cover plate at most through the preload bolts.

8. A load cell according to claim 1, further comprising a preamplifier integrated into the load cell.

9. A load cell according to claim 1, wherein each of the base plate and the cover plate includes means for mounting the load cell to a wheel to be tested.

10. A load cell according to claim 1, wherein each of the base plate and the cover plate includes mounting bores configured for mounting the load cell to a wheel to be tested.

11. A load cell according to claim 1, wherein the load cell is configured to withstand forces encountered in the region of heavy truck wheels.

12. A test arrangement for measuring at least one of the forces encountered on a wheel, the test arrangement comprising:
   a sufficient number of load cells according to claim 1 such that the load cells together can absorb and measure a load of more than 30 kN in at least one direction without the load cells being damaged.

13. A test arrangement for measuring at least one of the forces encountered on a wheel, the test arrangement comprising:
   a sufficient number of load cells according to claim 1 such that the load cells together can absorb and measure a load of more than 40 kN in at least one direction without the load cells being damaged.

14. A test arrangement for measuring at least one of the forces encountered on a wheel, wherein the test arrangement includes a load cell according to claim 1.

15. A test arrangement as in claim 14, wherein the load cell is disposed to measure forces encountered in the region of heavy truck wheels.

16. A test arrangement as in claim 14, wherein the load cell is disposed in the stationary region of a test stand.

17. A test arrangement as in claim 14, wherein the load cell is disposed in the rotating region of a test stand.

18. A test arrangement as in claim 14, wherein the load cell is disposed in the stationary region of a test vehicle.

19. A test arrangement as in claim 14, wherein the load cell is disposed in the rotating region of a test vehicle.

20. A method of measuring wheel forces, comprising:
   disposing a load cell according to claim 1 in the stationary region of a test stand.

21. A method of measuring wheel forces, comprising:
disposing a load cell according to claim 1 in the stationary region of a test vehicle.

22. A method of measuring wheel forces, comprising:
disposing a load cell according to claim 1 in the rotating region of a test stand.

23. A method of measuring wheel forces, comprising:

disposing a load cell according to claim 1 in the rotating region of a test vehicle.

\* \* \* \* \*